(12) United States Patent
Zhang et al.

(10) Patent No.: US 12,217,607 B2
(45) Date of Patent: Feb. 4, 2025

(54) PARKING AREA RECOMMENDATION METHOD AND APPARATUS, AND MEDIUM

(71) Applicant: BEIJING BAIDU NETCOM SCIENCE TECHNOLOGY CO., LTD., Beijing (CN)

(72) Inventors: Yiming Zhang, Beijing (CN); Xiongfei Tan, Beijing (CN); Tingting Ge, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/908,789

(22) PCT Filed: Feb. 28, 2022

(86) PCT No.: PCT/CN2022/078157
§ 371 (c)(1),
(2) Date: Sep. 1, 2022

(87) PCT Pub. No.: WO2022/237277
PCT Pub. Date: Nov. 17, 2022

(65) Prior Publication Data
US 2024/0194071 A1    Jun. 13, 2024

(30) Foreign Application Priority Data
May 12, 2021   (CN) .......................... 202110518142.7

(51) Int. Cl.
G08G 1/14   (2006.01)
G06F 18/23  (2023.01)

(52) U.S. Cl.
CPC ............. *G08G 1/144* (2013.01); *G06F 18/23* (2023.01)

(58) Field of Classification Search
CPC .............................. G08G 1/144; G08G 18/23
(Continued)

(56) References Cited

U.S. PATENT DOCUMENTS 10,169,993 B1 *  1/2019  Dance ................. G08G 1/0141
10,424,202 B1 *  9/2019  Beaurepaire ....... G01C 21/3685
(Continued)

FOREIGN PATENT DOCUMENTS

CN    105723433 A    6/2016
CN    106971604 A    7/2017
(Continued)

OTHER PUBLICATIONS

Notice of the Third review opinion dated Dec. 5, 2022 issued in Application No. 202110518142.7.
(Continued)

*Primary Examiner* — Kerri L McNally
*Assistant Examiner* — Thang D Tran
(74) *Attorney, Agent, or Firm* — Hunton Andrews Kurth LLP (57) ABSTRACT

Provided are a parking area recommendation method and apparatus, an electronic device, and a medium. The parking area recommendation method includes: determining parking space occupancy data of a target parking lot; and selecting a target parking area from a plurality of candidate parking areas of the target parking lot according to the parking space occupancy data, where each candidate parking area includes at least two parking spaces.

13 Claims, 2 Drawing Sheets

S101
Determine parking space occupancy data of a target parking lot

S102
Select a target parking area from a plurality of candidate parking areas of the target parking lot according to the parking space occupancy data; wherein each of the plurality of candidate parking areas comprises at least two parking spaces (58) Field of Classification Search
USPC .................................................... 340/932.2
See application file for complete search history.

(56) References Cited

U.S. PATENT DOCUMENTS

| | | | | |
|---|---|---|---|---|
| 11,062,602 | B1* | 7/2021 | Beaurepaire | G08G 1/146 |
| 2006/0250278 | A1* | 11/2006 | Tillotson | G08G 1/14 |
| | | | | 340/932.2 |
| 2009/0106040 | A1* | 4/2009 | Jones | G06Q 30/02 |
| | | | | 705/319 |
| 2014/0278086 | A1* | 9/2014 | San Filippo | G01C 21/3492 |
| | | | | 701/527 |
| 2016/0003637 | A1* | 1/2016 | Andersen | G01C 21/362 |
| | | | | 701/519 |
| 2016/0253847 | A1* | 9/2016 | Ullrich | G08G 1/143 |
| | | | | 705/13 |
| 2017/0061508 | A1* | 3/2017 | Sen | G06Q 20/20 |
| 2017/0118307 | A1* | 4/2017 | Beaurepaire | H04W 4/40 |
| 2017/0243488 | A1* | 8/2017 | Meijer | G08G 1/0141 |
| 2018/0313660 | A1* | 11/2018 | Eyster | G01C 21/3685 |
| 2018/0313661 | A1* | 11/2018 | Eyster | G08G 1/144 |
| 2020/0117926 | A1* | 4/2020 | Kim | G08G 1/143 |
| 2020/0168089 | A1* | 5/2020 | Nadgir | G08G 1/146 |
| 2021/0097861 | A1 | 4/2021 | Shi et al. | |
| 2021/0150901 | A1* | 5/2021 | Naamani | H04N 7/181 |
| 2022/0044198 | A1* | 2/2022 | Meister | G06Q 10/0833 |

FOREIGN PATENT DOCUMENTS

| | | | |
|---|---|---|---|
| CN | 107784856 | A | 3/2018 |
| CN | 109191896 | A | 1/2019 |
| CN | 109949606 | A | 6/2019 |
| CN | 110610250 | A | 12/2019 |
| CN | 111081058 | A | 4/2020 |
| CN | 111190942 | A | 5/2020 |
| CN | 112396862 | A | 2/2021 |
| CN | 113240936 | A | 8/2021 |
| DE | 102018107510 | B3 | 7/2019 |
| EP | 3462389 | A1 | 4/2019 |
| JP | 2008093362 | A | 4/2008 |
| JP | 2019158354 | A | 9/2019 |
| WO | 2021044616 | A1 | 3/2021 |

OTHER PUBLICATIONS

Supplemental Search Report dated Nov. 23, 2022 issued in application No. 2021105181427.
Notice of Reasons for Refusal drafted Aug. 31, 2023 issued in Japanese Application No. 2022-551580.
International Search Report dated May 5, 2022 issued in PCT/CN2022/078157.
First Office Action dated Jan. 6, 2022 issued in CN202110518142.7.
Notice of the Second Review opinion dated Aug. 30, 2022 issued in Chinese application No. 202110518142.7.
Chinese supplemental Search Report dated Aug. 19, 2022 issued in Chinese application No. 202110518142.7.
Extended European Search Report dated Sep. 13, 2024 issued in EP 22806254.3.

* cited by examiner

PARKING AREA RECOMMENDATION METHOD AND APPARATUS, AND MEDIUM

CROSS-REFERENCES TO RELATED APPLICATIONS

This application is a national stage application filed under 35 U.S.C. 371 based on International Patent Application No. PCT/CN2022/078157, filed on Feb. 28, 2022, which claims priority to Chinese Patent Application No. 202110518142.7 filed with the China National Intellectual Property Administration (CNIPA) on May 12, 2021, the disclosure of which are incorporated herein by reference in their entireties.

TECHNICAL FIELD

The present disclosure relates to the field of computer technologies and relates to the fields of machine learning technologies, cloud computing and cloud services, for example, a parking area recommendation method and apparatus, an electronic device, and a medium.

BACKGROUND

With the continuous increase of vehicle population, parking space resources are of severe shortage, and reasonable recommendation of parking spaces becomes more and more significant.

Parking space recommendation is mostly based on the distance between each parking space and the entrance and exit and the distance between each parking space and the elevator so as to recommend the optimal parking space to users.

SUMMARY

The present disclosure provides a method and apparatus, an electronic device, and a medium for improving the accuracy of the parking area recommendation.

According to an aspect of the present disclosure, a parking area recommendation method is provided. The method includes the steps described below.

Parking space occupancy data of a target parking lot is determined.

A target parking area is selected from a plurality of candidate parking areas of the target parking lot according to the parking space occupancy data; where each of the plurality of candidate parking areas includes at least two parking spaces.

According to another aspect of the present disclosure, a parking area recommendation apparatus is provided. The apparatus includes a parking space occupancy data determination module and a target parking area selection module.

The parking space occupancy data determination module is configured to determine parking space occupancy data of a target parking lot.

The target parking area selection module is configured to select a target parking area from a plurality of candidate parking areas of the target parking lot according to the parking space occupancy data; where each of the plurality of candidate parking areas includes at least two parking spaces.

According to another aspect of the present disclosure, an electronic device is provided. The electronic device includes at least one processor and a memory which is in a communication connection with the at least one processor.

The memory stores an instruction executable by the at least one processor, and the instruction, when executed by the at least one processor, enables the at least one processor to perform the parking area recommendation method described above.

According to another aspect of the present disclosure, a non-transitory computer-readable storage medium storing a computer instruction is provided, where the computer instruction is used for enabling a computer to perform the parking area recommendation method described above.

According to another aspect of the present disclosure, a computer program product is provided.

The computer program product includes a computer program, where the computer program, when executed by a processor, performs the parking area recommendation method described above.

DETAILED DESCRIPTION

Example embodiments of the present disclosure, including details of the embodiments of the present disclosure, are described hereinafter in conjunction with the drawings to facilitate understanding. The example embodiments are merely illustrative. Description of well-known functions and constructions is omitted hereinafter for clarity and conciseness.

Parking space recommendation is mostly based on the distance between each parking space and the entrance and exit and/or the distance between the position where the user gets off from the car and the elevator or stairs to recommend the optimal parking space to users. However, this method only considers the path distance dimension that users care about subjectively, and since just one single factor is considered, the current optimal parking area cannot be accurately recommended for users, resulting in a poor parking experience for users.

When a user parks in a parking lot, the user must analyze and determine which parking space to park according to the occupancy of parking spaces in the parking lot. For example, when the user enters the parking lot and finds that the parking spaces are of severe shortage, the user may choose a parking space that is the nearest to him while driving forward. For another example, when the user enters the parking lot and finds that plenty of parking spaces are available, the user may choose a parking space that is closer to the elevator or the entrance and exit. Therefore, the occupancy of parking spaces in parking lots is very important for users to select a parking area to park.

Figure 1:
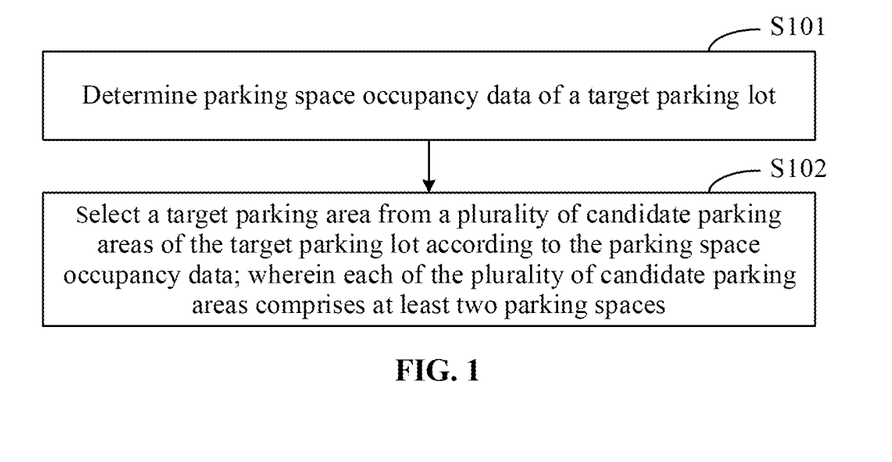
FIG. 1 is a flowchart of a parking area recommendation method according to an embodiment of the present disclosure.

FIG. 1 is a flowchart of a parking area recommendation method according to an embodiment of the present disclosure. This embodiment is suitable for a case of recommending a parking area of a target parking lot to a user. The method provided by this embodiment may be performed by a parking area recommendation apparatus according to an embodiment of the present disclosure.

The apparatus may be implemented by software and/or hardware and integrated in any electronic device having a computing capability.

As shown in FIG. 1, the parking area recommendation method disclosed by this embodiment may include the steps described below.

In S101, parking space occupancy data of a target parking lot is determined.

The types of the target parking lot include, but are not limited to, open parking lots, underground parking lots, and multistory parking lots. The number of floors of the target parking lot may be one or more. This embodiment does not limit the types and the number of floors of the target parking lot. The parking space occupancy data reflects the occupancy of parking spaces in the target parking lot. The parking space occupancy data may be represented by the number of occupied parking spaces, may also be represented by the parking space occupancy rate, and may also be represented by both the number of occupied parking spaces and the parking space occupancy rate. This embodiment does not limit the data type of the parking space occupancy data, and all the data that can reflect the occupancy of parking spaces in the target parking lot may be used as the parking space occupancy data.

In an embodiment, before a user enters the target parking lot, the user accesses the parking area recommendation interface in the client installed in the intelligent terminal and performs the operation of generating a parking area recommendation instruction in the parking area recommendation interface, where the intelligent terminal includes, but is not limited to, smart phones, smart tablets, smart watches, notebook computers and any electronic device equipped with an intelligent operating system. The operation of generating the parking area recommendation instruction includes, but is not limited to, the operation that the user clicks a preset control, such as a "parking area recommendation" button control, in the parking area recommendation interface to generate the parking area recommendation instruction. The parking area recommendation server acquires the parking area recommendation instruction sent by the client, acquires the occupancy of the parking spaces in the target parking lot, and then performs statistical analysis according to the occupancy of the parking spaces according to a preset rule to obtain the parking space occupancy data of the target parking lot. The occupancy of parking spaces includes a case where the parking space has been occupied and a case where the parking space is unoccupied. The manner of determining whether a parking space is occupied includes, but is not limited to, at least one of the following manners. 1) Whether the parking space is occupied is detected by a sensor installed on each parking space. For example, if it is detected, by a light sensor, that the light is blocked, it is determined that the parking space has been occupied. In another example, if it is detected, by a pressure sensor, that the pressure is increased, it is determined that the parking space has been occupied. 2) Whether the parking space is occupied is determined through a parking space image captured by a camera. For example, if a car is detected in the parking space image based on an object detection algorithm, it is determined that the parking space has been occupied.

Optionally, the parking space occupancy data includes at least one of a total parking space occupancy rate, a parking space occupancy rate of each floor, a parking space occupancy rate of each candidate parking area or a parking space occupancy rate of a key parking area; where the key parking area is determined according to identification information of each candidate parking area.

The total parking space occupancy rate indicates the total occupancy rate of parking spaces in the target parking lot and is represented by the ratio of the total number of occupied parking spaces to the total number of parking spaces. For example, if the total number of occupied parking spaces is 500 and the total number of parking spaces is 1000, the total parking space occupancy rate is 500/1000×100%=50%.

The parking space occupancy rate of each floor indicates the occupancy rate of parking spaces on each floor of the target parking lot and is represented by the ratio of the number of occupied parking spaces on a floor to the total number of parking spaces on the floor. For example, if the number of occupied parking spaces on the first floor of the target parking lot is 100 and the total number of parking spaces on the first floor of the target parking lot is 150, the parking space occupancy rate on the first floor of the target parking lot is 100/150×100%=66%.

The candidate parking areas are obtained by performing area partition on a plurality of parking spaces in the target parking lot by relevant personnel. The parking space occupancy rate of each candidate parking area is represented by the ratio of the number of occupied parking spaces in the candidate parking area to the total number of parking spaces in the candidate parking area. For example, if the number of occupied parking spaces in the candidate parking area A is 10 and the total number of parking spaces in the candidate parking area A is 50, the parking space occupancy rate of the candidate parking area A is 10/50×100%=20%.

The key parking area is a candidate parking area that has relatively high importance and is set by relevant personnel in advance, such as a candidate parking area near the elevator, a candidate parking area near the entrance of the target parking lot, a candidate parking area near the exit of the target parking lot, a candidate parking area near the entrance of the floor, or a candidate parking area near the exit of the floor. Different candidate parking areas correspond to different identification information, and the key parking area is determined according to the identification information of the candidate parking area. For example, if candidate parking areas with identification information of "0001", "0005" and "0010" are preset as key parking areas, the identification information of the candidate parking areas is traversed, the candidate parking areas with identification information of "0001", "0005" and "0010" are taken as the key parking areas, and the parking space occupancy rates of the candidate parking areas with identification information of "0001", "0005" and "0010" are taken as the parking space occupancy rates of the corresponding key parking areas.

At least one of the total parking space occupancy rate, the parking space occupancy rate of each floor, the parking space occupancy rate of each candidate parking area or the parking space occupancy rate of the key parking area is taken as the parking space occupancy data so that the data dimension of the parking space occupancy data is expanded, indirectly improving the accuracy of final parking area recommendation.

Optionally, the parking space occupancy data includes at least one of the total number of occupied parking spaces, the number of occupied parking spaces on each floor, the number of occupied parking spaces in each candidate parking area or the number of occupied parking spaces in a key parking area.

The total number of occupied parking spaces indicates the total number of occupied parking spaces in the target parking lot. The number of occupied parking spaces on each floor indicates the number of occupied parking spaces on each floor in the target parking lot. The number of occupied parking spaces in a candidate parking area indicates the number of occupied parking spaces in the candidate parking area. The number of occupied parking spaces in a key parking area indicates the number of occupied parking spaces in the candidate parking area that has relatively high importance and is set by relevant personnel in advance.

The determination of the parking space occupancy data of the target parking lot lays a data foundation for the selection of the target parking area according to the parking space occupancy data.

In S102, a target parking area is selected from a plurality of candidate parking areas of the target parking lot according to the parking space occupancy data; where each of the plurality of candidate parking areas includes at least two parking spaces.

In an embodiment, parking space occupancy rates of a plurality of candidate parking areas are sorted, and a target parking area is selected from the plurality of candidate parking areas according to the ascending order of parking space occupancy rates. Optionally, the candidate parking area with the lowest parking space occupancy rate is selected as the target parking area. After the target parking area is selected, the parking area recommendation server generates a display instruction according to the target parking area and sends the display instruction to the client so that the client can display the target parking area to the user according to the display instruction.

In another embodiment, the target parking area is selected from the plurality of candidate parking areas of the target parking lot according to the parking space occupancy data and based on a parking area recommendation model.

The parking area recommendation model is trained based on the historical parking behaviors of the user, and the historical parking behavior includes a historical parking area, and historical parking space occupancy data.

The parking area recommendation model is trained using a machine learning method according to historical parking areas and historical parking space occupancy data in historical parking behaviors of massive users. The current parking space occupancy data corresponding to the current parking time instant of the user is inputted into the parking area recommendation model, and the target parking area is outputted.

The target parking area is selected from the plurality of candidate parking areas of the target parking lot according to the parking space occupancy data so that the technical effect of recommending the target parking area to the user is achieved.

In the present disclosure, the parking space occupancy data of the target parking lot is determined, and the target parking area is selected from a plurality of candidate parking areas of the target parking lot according to the parking space occupancy data. Since the parking space occupancy data is very important for the user to select a parking area to park, in the present disclosure, the effect of improving the accuracy of the parking area recommendation is achieved, thereby improving the parking experience of users.

On the basis of the embodiments described above, after S102, the method further includes the step described below.

The target parking space is selected from unoccupied parking spaces in the target parking area based on a preset parking space recommendation rule.

Optionally, the parking space recommendation rule includes, but is not limited to, the following four rules: A, B, C and D.

In rule A, if the target parking area includes three consecutive unoccupied parking spaces, the parking space located in the middle of the three consecutive unoccupied parking spaces is taken as the target parking space.

In rule B, if the target parking area includes two consecutive unoccupied parking spaces, any of the two consecutive unoccupied parking spaces is taken as the target parking space.

In rule C, if the target parking area does not include any consecutive unoccupied parking spaces, the parking space located at the edge of the target parking area is taken as the target parking space.

In rule D, if the target parking area does not include any consecutive unoccupied parking spaces, any unoccupied parking space is taken as the target parking space.

The priority of the above four parking space recommendation rules from high to low is parking space recommendation rule A, parking space recommendation rule B, parking space recommendation rule C and parking space recommendation rule D.

The target parking space is selected from the unoccupied parking spaces in the target parking area based on the preset parking space recommendation rule so that the effect of recommending the parking space to the user is achieved, further satisfying the parking needs of users and improving the parking experience of users.

When the target parking area is selected from the plurality of candidate parking areas of the target parking lot according to the parking space occupancy data based on the parking area recommendation model, if the parking area recommendation model is established with the occupancy of each parking space as a feature field, the parking area recommendation model is very complex and becomes difficult to fit.

Figure 2:
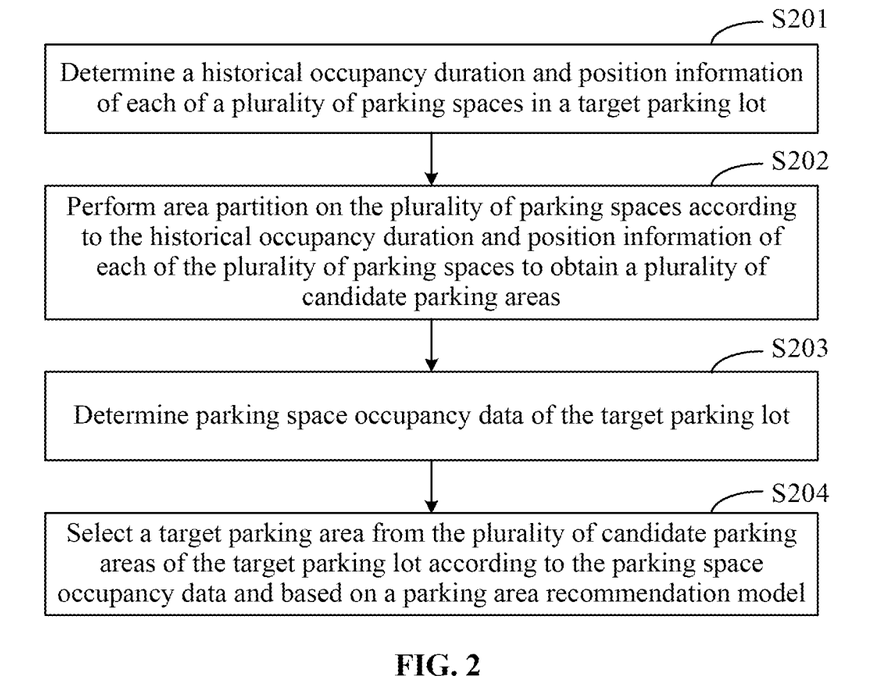
FIG. 2 is a flowchart of a parking area recommendation method according to an embodiment of the present disclosure.

FIG. 2 is a flowchart of a parking area recommendation method according to an embodiment of the present disclosure. This embodiment is extended based on the basis of technical solutions described above and may be combined with the optional embodiments described above.

In S201, a historical occupancy duration and position information of each of a plurality of parking spaces in the target parking lot are determined.

The position information of any parking space indicates a relative position of the parking space in the target parking lot, and the position information of the parking space may be represented by position coordinates. The historical occupancy duration of any parking space indicates the average duration when the parking space is occupied in the historical time period, where the historical time period may be a time period, such as a time period from 12:00 to 13:00, and the historical time period may also be days or weeks. This embodiment does not limit the historical time period.

In S202, area partition is performed on the plurality of parking spaces according to the historical occupancy duration and position information of each of the plurality of parking spaces to obtain the plurality of candidate parking areas.

In an embodiment, the plurality of parking spaces are clustered according to the historical occupancy duration and position information of each of the plurality of parking spaces, and area partition is performed on the plurality of parking spaces according to the clustering result to obtain the plurality of candidate parking areas of the target parking lot.

Optionally, S202 includes A1 and B1.

In A1, the plurality of parking spaces are clustered according to the historical occupancy duration of each of the plurality of parking spaces to obtain an occupancy duration clustering result of the plurality of parking spaces.

In an embodiment, the historical occupancy durations of a plurality of parking spaces are clustered using a clustering algorithm to obtain an occupancy duration clustering result of the plurality of parking spaces, where the clustering algorithm includes, but is not limited to, a K-means clustering algorithm, a mean shift clustering algorithm, a density-based clustering algorithm, or an agglomerative hierarchical clustering algorithm.

Optionally, A1 includes A11, A12 and A13.

In A11, a historical average occupancy duration of each of the plurality of parking spaces in each of a plurality of time periods is determined.

For example, the occupancy duration of each parking space in any day is counted in 24 time periods, that is, the occupancy duration in each of the time period from 0:00 to 1:00, the time period from 1:00 to 2:00, the time period from 2:00 to 3:00, the time period from 3:00 to 4:00, the time period from 4:00 to 5:00, the time period from 5:00 to 6:00, the time period from 6:00 to 7:00, the time period from 7:00 to 8:00, the time period from 8:00 to 9:00, the time period from 9:00 to 10:00, the time period from 10:00 to 11:00, the time period from 11:00 to 12:00, the time period from 12:00 to 13:00, the time period from 13:00 to 14:00, the time period from 14:00 to 15:00, the time period from 15:00 to 16:00, the time period from 16:00 to 17:00, the time period from 17:00 to 18:00, the time period from 18:00 to 19:00, the time period from 19:00 to 20:00, the time period from 20:00 to 21:00, the time period from 21:00 to 22:00, the time period from 22:00 to 23:00, and the time period from 23:00 to 24:00 is counted, respectively. Then, the average historical duration of each time period in a preset historical time interval, such as 30 days, is calculated.

In A12, an occupancy duration vector of each of the plurality of parking spaces is constructed according to the historical average occupancy duration in each of the plurality of time periods.

In an embodiment, vector assignment is performed using a preset vector assignment rule according to the historical average occupancy duration in each time period to construct the occupancy time vector of each parking space.

Optionally, the vector assignment rule may be as follows: the historical average occupancy duration of each time period is divided into three cases: the first case is that the parking space is occupied for a short time, that is, the historical average occupancy duration is 0 to 10 minutes; the second case is that the parking space is occupied for a relatively long time, that is, the historical average occupancy duration is 10 to 40 minutes; and the third case is that the parking space is occupied for a long time, that is, the historical average occupancy duration is 40 to 60 minutes; for the first case, the vector is assigned "0"; for the second case, the vector is assigned a value of "1"; and for the third case, the vector is assigned a value of "2". In this manner, a 1*24-dimensional occupancy duration vector is constructed.

For example, assuming that the historical average occupancy duration of any parking space from 5:00 to 6:00 is 24 minutes, the vector of this time period is assigned "1".

In A13, the plurality of parking spaces are clustered according to the occupancy duration vector of each of the plurality of parking spaces to obtain the occupancy duration clustering result of the plurality of parking spaces.

In an embodiment, 1*24-dimensional occupancy duration vectors corresponding to the plurality of parking spaces are clustered using a clustering algorithm to obtain the occupancy duration clustering result of the plurality of parking spaces. The number of categories of the occupancy duration clustering result may be set according to requirements, for example, there are three categories of occupancy duration clustering results.

The historical average occupancy duration of each of the plurality of parking spaces in each of a plurality of time periods is determined, the occupancy duration vector of each of the plurality of parking spaces is constructed according to the historical average occupancy duration in each of the plurality of time periods, and the plurality of parking spaces are clustered according to the occupancy duration vector of each of the plurality of parking spaces to obtain the occupancy duration clustering result of the plurality of parking spaces so that the clustering of the plurality of parking spaces based on the historical average occupancy duration is achieved. In this manner, it is ensured that the plurality of parking spaces in each candidate parking area obtained by subsequent area partition have similar historical average occupancy durations so that the occupancy of the plurality of parking spaces in each candidate parking area is similar.

In B1, area partition is performed on the plurality of parking spaces according to the occupancy duration clustering result and the position information of each of the plurality of parking spaces to obtain the plurality of candidate parking areas.

In an embodiment, occupancy duration clustering results and position information of a plurality of parking spaces are fused, fusion results are re-clustered using a clustering algorithm, and area partition is performed on the plurality of parking spaces according to the clustering result to obtain a plurality of candidate parking areas.

Optionally, B1 includes B11, B12 and B13.

In B11, a spatial position vector of each of the plurality of parking spaces is constructed according to the occupancy duration clustering result and the position information of each of the plurality of parking spaces.

In an embodiment, the occupancy duration category of each parking space is determined according to the occupancy duration clustering result, and the occupancy duration category and the position information of the parking space are fused to construct a spatial position vector of the parking space.

For example, it is assumed that there are a total of 10 parking spaces: A01, A02, A03, A04, A05, A06, A07, A08, A09, and A10. The position information of the 10 parking spaces is (x1, y1), (x2, y2), (x3, y3), (x4, y4), (x5, y5), (x6, y6), (x7, y7), (x8, y8), (x9, y9), and (x10, y10). The occupancy duration clustering result includes three occupancy duration categories: Category 1, Category 2 and Category 3. Category 1 includes A01, A05 and A08, Category 2 includes A02, A03 and A10, and Category 3 includes A04, A06, A07 and A09. Then, the spatial position vectors of the 10 parking spaces are: A01 (1, x1, y1), A02 (2, x2, y2), A03 (2, x3, y3), A04 (3, x4, y4), A05 (1, x5, y5), A06 (3, x6, y6), A07 (3, x7, y7), A08 (1, x8, y8), A09 (3, x9, y9) and A10 (2, x10, y10), respectively. That is, each parking space corresponds to a 1*3-dimensional spatial position vector.

In B12, the plurality of parking spaces are clustered according to the spatial position vector of each of the plurality of parking spaces to obtain a spatial position clustering result of the plurality of parking spaces.

In an embodiment, 1*3-dimensional spatial position vectors corresponding to the plurality of parking spaces are clustered using a clustering algorithm to obtain the spatial position clustering result of the plurality of parking spaces.

In B13, area partition is performed on the plurality of parking spaces according to the spatial position clustering result of the plurality of parking spaces to obtain the plurality of candidate parking areas.

In an embodiment, parking spaces of the same category are classified as the same candidate parking area according to the spatial position clustering result. For example, if the spatial position clustering result includes three categories: Category 1, Category 2 and Category 3, the parking spaces of Category 1 are classified as one candidate parking area, the parking spaces of Category 2 are classified as one candidate parking area, and the parking spaces of Category 3 are classified as one candidate parking area.

The spatial position vector of each of the plurality of parking spaces is constructed according to the occupancy duration clustering result and the position information of each of the plurality of parking spaces, the plurality of parking spaces are clustered according to the spatial position vector of each of the plurality of parking spaces to obtain a spatial position clustering result of the plurality of parking spaces, and area partition is performed on the plurality of parking spaces according to the spatial position clustering result of the plurality of parking spaces to obtain the plurality of candidate parking areas so that the clustering of the plurality of parking spaces based on the position information is achieved. In this manner, it is ensured that the plurality of parking spaces in each obtained candidate parking area have similar position information so that the position information of the plurality of parking spaces in each candidate parking area is similar.

The plurality of parking spaces are clustered according to the historical occupancy duration of each of the plurality of parking spaces to obtain an occupancy duration clustering result of the plurality of parking spaces, and area partition is performed on the plurality of parking spaces according to the occupancy duration clustering result and the position information of each of the plurality of parking spaces to obtain the plurality of candidate parking areas so that the plurality of candidate parking areas are obtained based on the historical occupancy duration and the position information of each of the plurality of parking spaces. In this manner, it is ensured that the plurality of parking spaces in each obtained candidate parking area have similar historical occupancy duration and position information so that the plurality of parking spaces in each candidate parking area are similar in the occupancy and the spatial position.

In S203, parking space occupancy data of a target parking lot is determined.

In S204, the target parking area is selected from the plurality of candidate parking areas of the target parking lot according to the parking space occupancy data and based on a parking area recommendation model.

Optionally, the parking area recommendation model is trained in the following manner.

A historical parking area where a user parks at one historical time instant and historical parking space occupancy data of the target parking lot corresponding to the historical time instant are determined, and model training is performed according to the historical parking space occupancy data and the historical parking area to obtain the parking area recommendation model.

In an embodiment, with the historical parking area where the user parks at any historical time instant as a training label and the historical parking space occupancy data of the target parking lot corresponding to the historical time instant as training data, model training is performed to obtain the parking area recommendation model.

For example, assuming that the user A parks in the parking area C at the time instant B and the parking space occupancy data corresponding to the time instant B is D, D is taken as the training data and C is taken as the training label of D to perform model training to obtain a parking area recommendation model.

The historical parking area where a user parks at any historical time instant and historical parking space occupancy data of the target parking lot corresponding to the historical time instant are determined, and model training is performed according to the historical parking space occupancy data and the historical parking area to obtain the parking area recommendation model so that the parking behavior of the user is learned using a machine learning manner. In this manner, the target parking area obtained through the trained parking area recommendation model more satisfies the actual parking requirements of the user.

Optionally, the types of parking area recommended models include, but are not limited to, a random forest model, an eXtreme gradient boosting (XGBoost) model, a Light Gradient Boosting Machine (LightGBM) model, or a CatBoost model.

In the present disclosure, the historical occupancy duration and position information of each of a plurality of parking spaces in the target parking lot are determined, and area partition is performed on the plurality of parking spaces according to the historical occupancy duration and position information of each of the plurality of parking spaces to obtain the plurality of candidate parking areas so that the plurality of parking spaces in the same candidate parking area are similar in the occupancy and spatial position. Therefore, only the occupancy of candidate parking areas needs to be taken as the feature field to establish the parking area recommendation model, and the occupancy of each parking space does not need to be taken as the feature field to establish the parking area recommendation model, thereby greatly reducing the complexity of the parking area recommendation model and ensuring that the model can be fitted normally. The target parking area is selected from the plurality of candidate parking areas of the target parking lot according to the parking space occupancy data and based on a parking area recommendation model so that the effect of quickly recommending the target parking area to users based on the recommendation model is achieved.

On the basis of the embodiments described above, the method further includes the steps described below.

Current time information corresponding to a current time instant is determined, where the current time information includes at least one of a month, a week, a day or a time period; and the target parking area is selected from the plurality of candidate parking areas of the target parking lot according to the current time information and the parking space occupancy data.

The "month" means the month where the current time instant is, such as January or February; the "week" means the week where the current time instant is in a month; the "day" means the day where the current time instant is in a week; and the "time period" means the time at which the current time instant is in a day.

In an embodiment, the target parking area is selected from the plurality of candidate parking areas of the target parking lot according to the current time information and the parking space occupancy data and based on the parking area recommendation model.

The parking area recommendation model is trained in the following manner: a historical parking area where a user parks at any historical time instant and historical parking space occupancy data of the target parking lot corresponding to the historical time instant are determined, and model training is performed according to historical time information of the historical time instant, the historical parking space occupancy data and the historical parking area to obtain the parking area recommendation model. The training process of the parking area recommendation model is similar to the model training process in S204 of this embodiment, and details will not be repeated herein.

Current time information corresponding to a current time instant is determined, where the current time information includes at least one of a month, a week, a day or a time period, and the target parking area is selected from the plurality of candidate parking areas of the target parking lot according to the current time information and the parking space occupancy data so that the effect that the target parking area is determined based on both the current time information and the parking space occupation data is achieved, thereby further improving the accuracy of the parking area recommendation and improving the parking experience of users.

In the technical solutions of the present disclosure, acquisition, storage and application of user personal information involved herein are in compliance with relevant laws and regulations and do not violate the public order and good customs.

Figure 3:
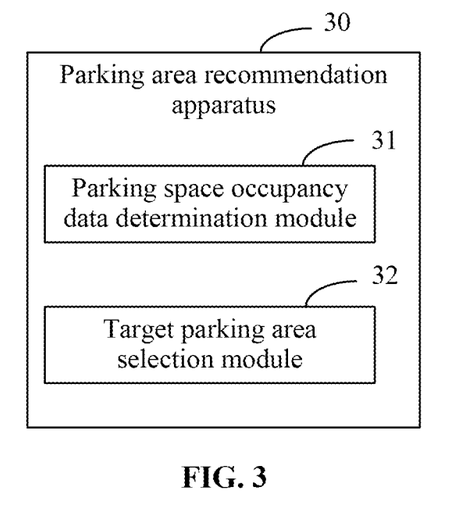
FIG. 3 is a structural schematic diagram of a parking area recommendation apparatus according to an embodiment of the present disclosure.

FIG. 3 is a structural schematic diagram of a parking area recommendation apparatus according to an embodiment of the present disclosure. This embodiment is suitable for a case of recommending a parking area of a target parking lot to a user. The apparatus provided by this embodiment may be implemented by software and/or hardware and integrated in any electronic device having a computing capability.

As shown in FIG. 3, the parking area recommendation apparatus 30 disclosed by this embodiment may include a parking space occupancy data determination module 31 and a target parking area selection module 32.

The parking space occupancy data determination module 31 is configured to determine parking space occupancy data of a target parking lot. The target parking area selection module 32 is configured to select a target parking area from a plurality of candidate parking areas of the target parking lot according to the parking space occupancy data; where each of the plurality of candidate parking areas includes at least two parking spaces.

Optionally, the target parking area selection module 32 is configured to select the target parking area from the plurality of candidate parking areas of the target parking lot according to the parking space occupancy data and based on a parking area recommendation model, where the parking area recommendation model is trained in the following manner.

A historical parking area where a user parks at one historical time instant and historical parking space occupancy data of the target parking lot corresponding to the historical time instant are determined, and model training is performed according to the historical parking space occupancy data and the historical parking area to obtain the parking area recommendation model.

Optionally, the apparatus further includes a candidate parking area determination module. The candidate parking area determination module is configured to determine a historical occupancy duration and position information of each of a plurality of parking spaces in the target parking lot and perform the area partition on the plurality of parking spaces according to the historical occupancy duration and position information of each of the plurality of parking spaces to obtain the plurality of candidate parking areas.

Optionally, the candidate parking area determination module is configured to perform area partition on the plurality of parking spaces according to the historical occupancy duration and position information of each of the plurality of parking spaces in the following manner to obtain the plurality of candidate parking areas.

The plurality of parking spaces are clustered according to the historical occupancy duration of each of the plurality of parking spaces to obtain an occupancy duration clustering result of the plurality of parking spaces, and the area partition is performed on the plurality of parking spaces according to the occupancy duration clustering result and the position information of each of the plurality of parking spaces to obtain the plurality of candidate parking areas.

Optionally, the candidate parking area determination module is configured to cluster the plurality of parking spaces according to the historical occupancy duration of each of the plurality of parking spaces in the following manner to obtain the occupancy duration clustering result of the plurality of parking spaces.

A historical average occupancy duration of each of the plurality of parking spaces in each of a plurality of time periods is determined, an occupancy duration vector of each of the plurality of parking spaces is constructed according to the historical average occupancy duration in each of the plurality of time periods; and the plurality of parking spaces are clustered according to the occupancy duration vector of each of the plurality of parking spaces to obtain the occupancy duration clustering result of the plurality of parking spaces.

Optionally, the candidate parking area determination module is configured to perform the area partition on the plurality of parking spaces according to the occupancy duration clustering result and the position information of each of the plurality of parking spaces in the following manner to obtain the plurality of candidate parking areas.

A spatial position vector of each of the plurality of parking spaces is constructed according to the occupancy duration clustering result and the position information of each of the plurality of parking spaces, the plurality of parking spaces are clustered according to the spatial position vector of each of the plurality of parking spaces to obtain a spatial position clustering result of the plurality of parking spaces; and the area partition is performed on the plurality of parking spaces according to the spatial position clustering result of the plurality of parking spaces to obtain the plurality of candidate parking areas.

Optionally, the parking space occupancy data includes at least one of a total parking space occupancy rate, a parking space occupancy rate of each floor, a parking space occupancy rate of each candidate parking area or a parking space occupancy rate of a key parking area; where the key parking area is determined according to identification information of each candidate parking area.

Optionally, the apparatus further includes a current time information determination module. The current time information determination module is configured to determine current time information corresponding to a current time instant, where the current time information includes at least one of a month, a week, a day or a time period, and select the target parking area from the plurality of candidate parking areas of the target parking lot according to the current time information and the parking space occupancy data.

The parking area recommendation apparatus 30 disclosed by this embodiment of the present disclosure can perform the parking area recommendation method disclosed by the embodiments of the present disclosure and has functional modules and effects corresponding to the performed method. For content not described in detail in this embodiment, reference may be made to the description in any method embodiment of the present disclosure.

According to an embodiment of the present disclosure, the present disclosure further provides an electronic device, a readable storage medium and a computer program product.

Figure 4:
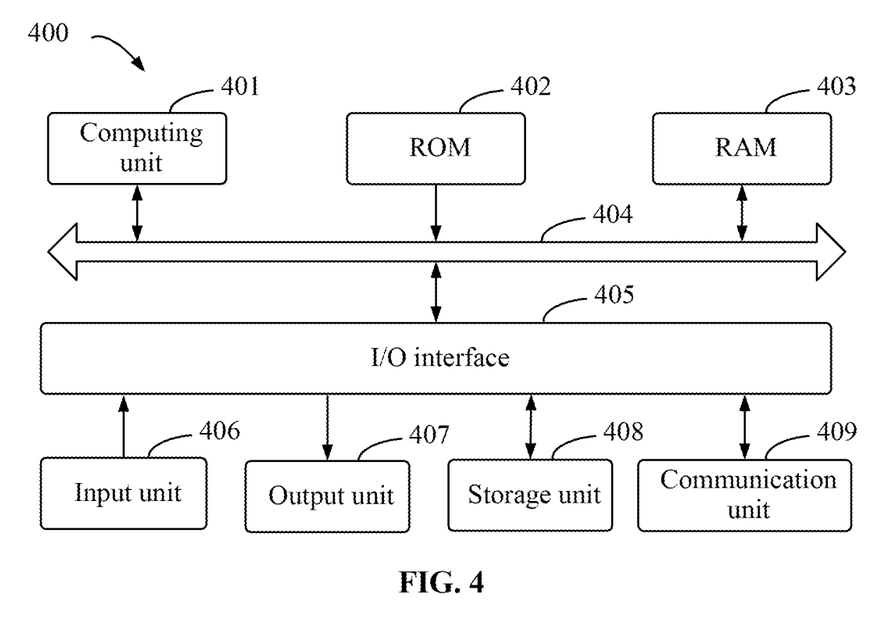
FIG. 4 is a block diagram of an electronic device for implementing a parking area recommendation method according to an embodiment of the present disclosure.

FIG. 4 is a block diagram of an electronic device for implementing a parking area recommendation method according to an embodiment of the present disclosure. The electronic device 400 is intended to represent various forms of digital computer, for example, a laptop computer, a desktop computer, a worktable, a personal digital assistant, a server, a blade server, a mainframe computer or another applicable computer. The electronic device 400 may also represent various forms of mobile devices, for example, a personal digital assistant, a cellphone, a smartphone, a wearable device or another similar computing device. Herein the shown components, the connections and relationships between these components, and the functions of these components are illustrative only and are not intended to limit the implementation of the present disclosure as described and/or claimed herein.

As shown in FIG. 4, the device 400 includes a computing unit 401. The computing unit 401 may perform various types of appropriate operations and processing based on a computer program stored in a read-only memory (ROM) 402 or a computer program loaded from a storage unit 408 to a random-access memory (RAM) 403. Various programs and data required for operations of the device 400 may also be stored in the RAM 403. The computing unit 401, the ROM 402 and the RAM 403 are connected to each other via a bus 404. An input/output (I/O) interface 405 is also connected to the bus 404.

Multiple components in the device 400 are connected to the I/O interface 405. The multiple components include an input unit 406 such as a keyboard and a mouse, an output unit 407 such as various types of displays and speakers, the storage unit 408 such as a magnetic disk and an optical disk, and a communication unit 409 such as a network card, a modem and a wireless communication transceiver. The communication unit 409 allows the device 400 to exchange information/data with other devices over a computer network such as the Internet and/or various telecommunications networks.

The computing unit 401 may be a general-purpose and/or special-purpose processing component having multiple processing and computing capabilities. Some examples of the computing unit 401 include, but are not limited to, central processing units (CPUs), graphics processing units (GPUs), various special-purpose artificial intelligence (AI) computing chips, various computing units running machine learning models and algorithms, digital signal processing (DSP) and any suitable processors, controllers and microcontrollers. The computing unit 401 performs various methods and processing described above, such as the parking area recommendation method. For example, in some embodiments, the parking area recommendation method may be implemented as a computer software program tangibly contained in a machine-readable medium such as the storage unit 408. In some embodiments, part or all of a computer program may be loaded and/or installed on the device 400 via the ROM 402 and/or the communication unit 409. When the computer program is loaded to the RAM 403 and executed by the computing unit 401, one or more steps of the parking area recommendation method described above may be performed. Alternatively, in other embodiments, the computing unit 401 may be configured, in any other suitable manner (for example, by means of firmware), to perform the parking area recommendation method.

The various embodiments of the systems and techniques described herein may be performed in digital electronic circuitry, integrated circuitry, a field-programmable gate array (FPGA), an application-specific integrated circuit (ASIC), an application specific standard product (ASSP), a system on a chip (SoC), a complex programmable logic device (CPLD), computer hardware, firmware, software and/or a combination thereof. The various embodiments may include implementations in one or more computer programs. The one or more computer programs are executable, interpretable, or executable and interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementing the methods of the present disclosure may be compiled in any combination of one or more programming languages. These program codes may be provided for a processor or controller of a general-purpose computer, a special-purpose computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or used in conjunction with a system, apparatus or device that executes instructions. The machine-readable medium may be a machine-readable signal medium or a machine-readable storage medium. The machine-readable medium may include, but is not limited to, electronic, magnetic, optical, electromagnetic, infrared or semiconductor systems, apparatuses or devices or any suitable combinations thereof. Examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order to provide the interaction with a user, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in the service of a related physical host and a related virtual private server (VPS). The server may also be a server of a distributed system or a server combined with blockchain. Various forms of the preceding flows may be used, with steps reordered, added, or removed. For example, the steps described in the present disclosure may be executed in parallel, in sequence or in a different order as long as the desired result of the technical solution disclosed in the present disclosure is achieved. The execution sequence of these steps is not limited herein.

What is claimed is:

1. A parking area recommendation method, comprising:
   determining parking space occupancy data of a target parking lot; and
   selecting a target parking area from a plurality of candidate parking areas of the target parking lot according to the parking space occupancy data; wherein each of the plurality of candidate parking areas comprises at least two parking spaces;
   wherein the plurality of candidate parking areas are determined in the following manner:
   determining a historical occupancy duration and position information of each of a plurality of parking spaces in the target parking lot; and
   performing area partition on the plurality of parking spaces according to the historical occupancy duration and position information of each of the plurality of parking spaces to obtain the plurality of candidate parking areas;
   wherein the performing area partition on the plurality of parking spaces according to the historical occupancy duration and position information of each of the plurality of parking spaces to obtain the plurality of candidate parking areas comprises:
   clustering the plurality of parking spaces according to the historical occupancy duration of each of the plurality of parking spaces to obtain an occupancy duration clustering result of the plurality of parking spaces; and
   performing the area partition on the plurality of parking spaces according to the occupancy duration clustering result and the position information of each of the plurality of parking spaces to obtain the plurality of candidate parking areas;
   wherein performing the area partition on the plurality of parking spaces according to the occupancy duration clustering result and the position information of each of the plurality of parking spaces to obtain the plurality of candidate parking areas comprises:
   fusing the occupancy duration clustering result and the position information of each of the plurality of parking spaces, clustering a fusion result using a clustering algorithm, and performing the area partition on the plurality of parking spaces according to a clustering result of the fusion result to obtain the plurality of candidate parking areas.

2. The method according to claim 1, wherein the selecting a target parking area from a plurality of candidate parking areas of the target parking lot according to the parking space occupancy data comprises:
   selecting the target parking area from the plurality of candidate parking areas of the target parking lot according to the parking space occupancy data and based on a parking area recommendation model;
   wherein the parking area recommendation model is trained in the following manner:
   determining a historical parking area where a user parks at one historical time instant and historical parking space occupancy data of the target parking lot corresponding to the historical time instant; and
   performing model training according to the historical parking space occupancy data and the historical parking area to obtain the parking area recommendation model.

3. The method according to claim 1, wherein the clustering the plurality of parking spaces according to the historical occupancy duration of each of the plurality of parking spaces to obtain an occupancy duration clustering result of the plurality of parking spaces comprises:
   determining a historical average occupancy duration of each of the plurality of parking spaces in each of a plurality of time periods;
   constructing an occupancy duration vector of each of the plurality of parking spaces according to the historical average occupancy duration in each of the plurality of time periods; and
   clustering the plurality of parking spaces according to the occupancy duration vector of each of the plurality of parking spaces to obtain the occupancy duration clustering result of the plurality of parking spaces.

4. The method according to claim 1, wherein the performing the area partition on the plurality of parking spaces according to the occupancy duration clustering result and the position information of each of the plurality of parking spaces to obtain the plurality of candidate parking areas further comprises:
   constructing a spatial position vector of each of the plurality of parking spaces according to the occupancy duration clustering result and the position information of each of the plurality of parking spaces;
   clustering the plurality of parking spaces according to the spatial position vector of each of the plurality of parking spaces to obtain a spatial position clustering result of the plurality of parking spaces; and performing the area partition on the plurality of parking spaces according to the spatial position clustering result of the plurality of parking spaces to obtain the plurality of candidate parking areas.

5. The method according to claim 1, wherein the parking space occupancy data comprises at least one of a total parking space occupancy rate, a parking space occupancy rate of each floor, a parking space occupancy rate of each candidate parking area or a parking space occupancy rate of a key parking area; wherein the key parking area is determined according to identification information of each candidate parking area.

6. The method according to claim 1, further comprising:
determining current time information corresponding to a current time instant; wherein the current time information comprises at least one of a month, a week, a day or a time period; and
selecting the target parking area from the plurality of candidate parking areas of the target parking lot according to the current time information and the parking space occupancy data.

7. A parking area recommendation apparatus, comprising: at least one processor; and a memory, which is in a communication connection with the at least one processor; wherein
the memory stores an instruction executable by the at least one processor, and the instruction, when executed by the at least one processor, enables the at least one processor to perform following steps:
determining parking space occupancy data of a target parking lot; and
selecting a target parking area from a plurality of candidate parking areas of the target parking lot according to the parking space occupancy data; wherein each of the plurality of candidate parking areas comprises at least two parking spaces;
wherein the plurality of candidate parking areas are determined in the following manner:
determining a historical occupancy duration and position information of each of a plurality of parking spaces in the target parking lot; and
performing area partition on the plurality of parking spaces according to the historical occupancy duration and position information of each of the plurality of parking spaces to obtain the plurality of candidate parking areas;
wherein the performing area partition on the plurality of parking spaces according to the historical occupancy duration and position information of each of the plurality of parking spaces to obtain the plurality of candidate parking areas comprises:
clustering the plurality of parking spaces according to the historical occupancy duration of each of the plurality of parking spaces to obtain an occupancy duration clustering result of the plurality of parking spaces; and
performing the area partition on the plurality of parking spaces according to the occupancy duration clustering result and the position information of each of the plurality of parking spaces to obtain the plurality of candidate parking areas;
wherein performing the area partition on the plurality of parking spaces according to the occupancy duration clustering result and the position information of each of the plurality of parking spaces to obtain the plurality of candidate parking areas comprises:
fusing the occupancy duration clustering result and the position information of each of the plurality of parking spaces, clustering a fusion result using a clustering algorithm, and performing the area partition on the plurality of parking spaces according to a clustering result of the fusion result to obtain the plurality of candidate parking areas.

8. The apparatus according to claim 7, wherein the selecting a target parking area from a plurality of candidate parking areas of the target parking lot according to the parking space occupancy data comprises:
selecting the target parking area from the plurality of candidate parking areas of the target parking lot according to the parking space occupancy data and based on a parking area recommendation model;
wherein the parking area recommendation model is trained in the following manner:
determining a historical parking area where a user parks at one historical time instant and historical parking space occupancy data of the target parking lot corresponding to the historical time instant; and
performing model training according to the historical parking space occupancy data and the historical parking area to obtain the parking area recommendation model.

9. The apparatus according to claim 7, wherein the clustering the plurality of parking spaces according to the historical occupancy duration of each of the plurality of parking spaces to obtain an occupancy duration clustering result of the plurality of parking spaces comprises:
determining a historical average occupancy duration of each of the plurality of parking spaces in each of a plurality of time periods;
constructing an occupancy duration vector of each of the plurality of parking spaces according to the historical average occupancy duration in each of the plurality of time periods; and
clustering the plurality of parking spaces according to the occupancy duration vector of each of the plurality of parking spaces to obtain the occupancy duration clustering result of the plurality of parking spaces.

10. The apparatus according to claim 7, wherein the performing the area partition on the plurality of parking spaces according to the occupancy duration clustering result and the position information of each of the plurality of parking spaces to obtain the plurality of candidate parking areas further comprises:
constructing a spatial position vector of each of the plurality of parking spaces according to the occupancy duration clustering result and the position information of each of the plurality of parking spaces;
clustering the plurality of parking spaces according to the spatial position vector of each of the plurality of parking spaces to obtain a spatial position clustering result of the plurality of parking spaces; and
performing the area partition on the plurality of parking spaces according to the spatial position clustering result of the plurality of parking spaces to obtain the plurality of candidate parking areas.

11. The apparatus according to claim 7, wherein the parking space occupancy data comprises at least one of a total parking space occupancy rate, a parking space occupancy rate of each floor, a parking space occupancy rate of each candidate parking area or a parking space occupancy rate of a key parking area; wherein the key parking area is determined according to identification information of each candidate parking area.

12. The apparatus according to claim 7, wherein the processor is further configured to perform the following:

determining current time information corresponding to a current time instant; wherein the current time information comprises at least one of a month, a week, a day or a time period; and selecting the target parking area from the plurality of candidate parking areas of the target parking lot according to the current time information and the parking space occupancy data.

13. A non-transitory computer-readable storage medium storing a computer instruction, wherein the computer instruction is used for enabling a computer to perform the following steps:

determining parking space occupancy data of a target parking lot; and selecting a target parking area from a plurality of candidate parking areas of the target parking lot according to the parking space occupancy data; wherein each of the plurality of candidate parking areas comprises at least two parking spaces;

wherein the plurality of candidate parking areas are determined in the following manner:

determining a historical occupancy duration and position information of each of a plurality of parking spaces in the target parking lot; and performing area partition on the plurality of parking spaces according to the historical occupancy duration and position information of each of the plurality of parking spaces to obtain the plurality of candidate parking areas;

wherein the performing area partition on the plurality of parking spaces according to the historical occupancy duration and position information of each of the plurality of parking spaces to obtain the plurality of candidate parking areas comprises:

clustering the plurality of parking spaces according to the historical occupancy duration of each of the plurality of parking spaces to obtain an occupancy duration clustering result of the plurality of parking spaces; and performing the area partition on the plurality of parking spaces according to the occupancy duration clustering result and the position information of each of the plurality of parking spaces to obtain the plurality of candidate parking areas;

wherein performing the area partition on the plurality of parking spaces according to the occupancy duration clustering result and the position information of each of the plurality of parking spaces to obtain the plurality of candidate parking areas comprises:

fusing the occupancy duration clustering result and the position information of each of the plurality of parking spaces, clustering a fusion result using a clustering algorithm, and performing the area partition on the plurality of parking spaces according to a clustering result of the fusion result to obtain the plurality of candidate parking areas.

* * * * *